(12) United States Patent
Barth et al.

(10) Patent No.: US 11,972,688 B1
(45) Date of Patent: *Apr. 30, 2024

(54) ROADSIDE ASSISTANCE SYSTEM

(71) Applicant: Allstate Insurance Company, Northbrook, IL (US)

(72) Inventors: Kim Barth, Northbrook, IL (US); Christopher Adcock, Henrico, VA (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/331,890

(22) Filed: May 27, 2021

Related U.S. Application Data (63) Continuation of application No. 16/844,277, filed on Apr. 9, 2020, now Pat. No. 11,049,401, which is a continuation of application No. 16/414,175, filed on May 16, 2019, now Pat. No. 10,657,824.

(51) Int. Cl.
| | | |
|---|---|---|
| *G08G 1/00* | (2006.01) | |
| *G06F 16/2457* | (2019.01) | |
| *G06Q 10/0639* | (2023.01) | |

(52) U.S. Cl.
CPC ....... *G08G 1/205* (2013.01); *G06F 16/24578* (2019.01); *G06Q 10/06398* (2013.01)

(58) Field of Classification Search
CPC .............. G08G 1/205; G06F 16/24578; G06Q 10/06398
USPC .................................................... 455/404.2
See application file for complete search history.

(56) References Cited

U.S. PATENT DOCUMENTS

| | | |
|---|---|---|
| 6,950,801 B2 | 9/2005 | Brookes et al. |
| 7,627,422 B2 | 12/2009 | Adamczyk et al. |
| 8,612,262 B1 | 12/2013 | Condon et al. |
| 8,645,014 B1 | 2/2014 | Kozlowski et al. |
| 9,384,491 B1 | 7/2016 | Briggs et al. |
| 9,659,301 B1 | 5/2017 | Briggs et al. |
| 10,067,988 B2 | 9/2018 | Choksi et al. |
| 10,074,065 B2 | 9/2018 | Jones et al. |
| 10,083,608 B2 | 9/2018 | O'Sullivan |
| 10,657,824 B1 | 5/2020 | Barth et al. |
| 11,621,921 B2 * | 4/2023 | Zhang ................... H04L 47/283 370/235 |

(Continued)

OTHER PUBLICATIONS

Jun. 4, 2021—(CA) Office Action—App. No. 3078167.

(Continued)

*Primary Examiner* — Mong-Thuy T Tran
(74) *Attorney, Agent, or Firm* — Polsinelli PC (57) ABSTRACT

Systems, apparatuses, and methods for providing roadside assistance services are described herein. The system can include network computing devices and computing devices associated with vehicles and service vehicles. Requests for roadside services can be automatically assigned to an available service provider. Service providers can be ranked based on a variety of criteria and requests can be assigned based on the ranking. The ranking of service providers can be adjusted based on the performance of the service provider. If a service provider takes too long to respond to a request, the request can be automatically declined and an alternative service provider can be selected.

20 Claims, 6 Drawing Sheets

(56) References Cited

U.S. PATENT DOCUMENTS

| | | | |
|---|---|---|---|
| 2003/0014295 A1* | 1/2003 | Brookes | G06Q 10/06315 |
| | | | 705/7.25 |
| 2008/0293431 A1* | 11/2008 | Buerger | H04L 67/52 |
| | | | 455/456.1 |
| 2008/0313002 A1 | 12/2008 | McFarland et al. | |
| 2009/0216600 A1 | 8/2009 | Hill | |
| 2009/0284348 A1 | 11/2009 | Pfeffer | |
| 2010/0211428 A1 | 8/2010 | Duffy et al. | |
| 2013/0297387 A1 | 11/2013 | Michael | |
| 2014/0122135 A1 | 5/2014 | Bain | |
| 2014/0172727 A1 | 6/2014 | Abhyanker et al. | |
| 2014/0278636 A1 | 9/2014 | Chatmas | |
| 2015/0149286 A1* | 5/2015 | Brown, II | G06Q 30/0267 |
| | | | 705/14.58 |
| 2015/0161554 A1 | 6/2015 | Sweeney et al. | |
| 2015/0161696 A1 | 6/2015 | Jones et al. | |
| 2015/0278892 A1 | 10/2015 | Roy | |
| 2016/0092962 A1 | 3/2016 | Wasserman et al. | |
| 2016/0117642 A1* | 4/2016 | Sandhu | G06Q 10/1053 |
| | | | 705/321 |
| 2016/0140299 A1* | 5/2016 | Al Harbi | G16Z 99/00 |
| | | | 705/2 |
| 2016/0232598 A1* | 8/2016 | Wasserman | G06Q 20/322 |
| 2016/0269883 A1 | 9/2016 | Eswaran | |
| 2016/0364823 A1 | 12/2016 | Cao | |
| 2017/0004454 A1 | 1/2017 | Tang et al. | |
| 2017/0039890 A1 | 2/2017 | Truong et al. | |
| 2017/0124533 A1 | 5/2017 | Rodoni | |
| 2017/0220998 A1 | 8/2017 | Horn et al. | |
| 2017/0293950 A1 | 10/2017 | Rathod | |
| 2018/0025407 A1 | 1/2018 | Zhang et al. | |
| 2018/0240055 A1 | 8/2018 | Theus et al. | |
| 2018/0270610 A1 | 9/2018 | Song et al. | |
| 2018/0308069 A1* | 10/2018 | Starks | G06Q 10/063116 |
| 2019/0114692 A1* | 4/2019 | Briggs | G06F 16/583 |
| 2019/0205834 A1 | 7/2019 | Bell et al. | |
| 2019/0273807 A1* | 9/2019 | Mimran | H04L 67/1021 |
| 2020/0126326 A1* | 4/2020 | Lavie | G06Q 10/20 |
| 2021/0049657 A1* | 2/2021 | Mimran | H04M 15/00 |

OTHER PUBLICATIONS

Akman et al, Logistics Service Provider Selection through an Integrated Fuzzy Multicriteria Decision Making Approach, Journal of Industrial Engineering, vol. 2014, Article ID 794918, http://dx.doi.org/10.1155/2014/794918, Jun. 16, 2014, pp. 1-11.

Jarial et al, Ranking Of Vendors Based On Criteria By Mcdm-Matrix Method—A Case Study For Commercial Vehicles In An Automobile Industry, International Journal of Latest Research in Science and Technology, vol. 1, Issue 4, p. 337,342, Nov.-Dec. 2012, http://www.mnkjournals.com/ijlrst.htm, ISSN: 2278-5299, 5 pages.

Karrapan et al, Benchmarking Criteria For Evaluating Third-Party Logistics Providers In South Africa, Journal of Transport and Supply Chain Management, ISSN: (Online) 1995-5235, (Print) 2310-8789, http://www.jtscm.co.za, Jul. 26, 2017, 10 pages.

Hubbard, Information Decisions and Productivity: On-Board Computers and Capacity Utilization in Trucking, National Bureau of Economic Research, Cambridge, MA, Oct. 2001, 39 pages.

Ye et al, Selection of a Logistics Service Provider Based on Analytic Hierarchy Process (AHP) Approach, Högskolan I Gävle, Faculty of Engineering and Sustainable Development, Dept. of Industrial Development, IT and Land Management, Mar. 2014, 78 pages.

Jamil et al., A Study of Multicriteria Decision Making for Supplier Selection in Automotive Industry, Journal of Industrial Engineering, vol. 2013, Article ID 841584, https://www.hindawi.com/journals/jie/2013/841584, 2013, 22 pages.

Geraldo Oliveira Neto et al, Logistic Operator Selection with Capacity of Storage and Transport Frozen Product Using Multicriteria Decision, HAL archives-ouvertes.fr, IFIP International Conference on Advances in Production Management Systems (APMS), Sep. 2014, Ajaccio, France, 9 pages.

Oct. 10, 2019—(US) Non-Final Office Action—U.S. Appl. No. 16/414,175.

Feb. 7, 2020—(US) Notice of Allowance—U.S. Appl. No. 16/414,175.

Oct. 29, 2020—(US) Non-Final Office Action—U.S. Appl. No. 16/844,277.

Mar. 10, 2021—(US) Notice of Allowance—U.S. Appl. No. 16/844,277.

\* cited by examiner

FIG. 6

ROADSIDE ASSISTANCE SYSTEM

CROSS-REFERENCE TO RELATED APPLICATIONS

This application is a continuation of and claims priority to U.S. patent application Ser. No. 16/844,277, titled "Roadside Assistance System" and filed Apr. 9, 2020 which is a continuation of and claims priority to U.S. patent application Ser. No. 16/414,175, titled "Roadside Assistance System" filed May 16, 2019, now U.S. Pat. No. 10,657,824 issued May 19, 2020, the disclosure of which is hereby incorporated by reference in its entirety.

FIELD OF INVENTION

Aspects described herein generally relate to computer and network hardware and software. In particular, the present disclosure relates to methods and systems for organizing resources and providing roadside assistance services.

BACKGROUND

Vehicles can become disabled during a trip because of, for example, a vehicle malfunction, an accident, etc. A disabled vehicle can be a stressful situation for an owner or operator of a vehicle. The drivers and/or passengers of the disabled vehicle can contact a towing network for assistance. In some situations, the towing network might not have available service vehicles to assist the disabled vehicle. Additionally, the towing network can dispatch a service provider located far away from the disabled vehicle.

SUMMARY

The following summary presents a simplified summary of certain features. The summary is not an extensive overview and is not intended to identify key or critical elements.

Systems, apparatuses, and methods for providing roadside assistance services are described herein. The system can include network computing devices and computing devices associated with vehicles and service vehicles. Requests for roadside services can be automatically assigned to an available service provider. Service providers can be ranked based on a variety of criteria and requests can be assigned based on the ranking. The ranking of service providers can be adjusted based on the performance of the service provider. If a service provider takes too long to respond to a request, the request can be automatically declined and an alternative service provider can be selected.

These and other features and advantages are described in greater detail below.

BRIEF DESCRIPTION OF THE DRAWINGS

Some features are shown by way of example, and not by limitation, in the accompanying drawings In the drawings, like numerals reference similar elements.

DETAILED DESCRIPTION

The accompanying drawings, which form a part hereof, show examples of the disclosure. It is to be understood that the examples shown in the drawings and/or discussed herein are non-exclusive and that there are other examples of how the disclosure can be practiced.

Systems, apparatuses, and methods for providing roadside assistance services are described herein. The system can include network computing devices and computing devices associated with vehicles and service vehicles. The system can obtain requests for roadside services and automatically assign an available service provider to handle the request. Service providers can be ranked based on a variety of criteria and assigned based on their ranking. One or more rules can be applied to generate a recommendation for a service provider. The ranking of service providers can be adjusted based on the performance of the service provider. The performance of the service provider can be used to automatically determine the capacity of the service provider. If a service provider takes too long to respond to a request (e.g., a time period greater than a threshold time period), the request can be automatically declined and an alternative service provider can be selected.

Roadside assistance systems in accordance with embodiments of the invention greatly reduce the time and resources utilized to provide roadside assistance. Prior art systems typically take between three to five minutes to find a service provider, and this time can be even longer in bad weather. Roadside assistance systems typically take less than one minute to find a service provider, thereby reducing the time and resources needed to find an available service provider and providing an enhanced experience.

Operating Environments

Figure 1:
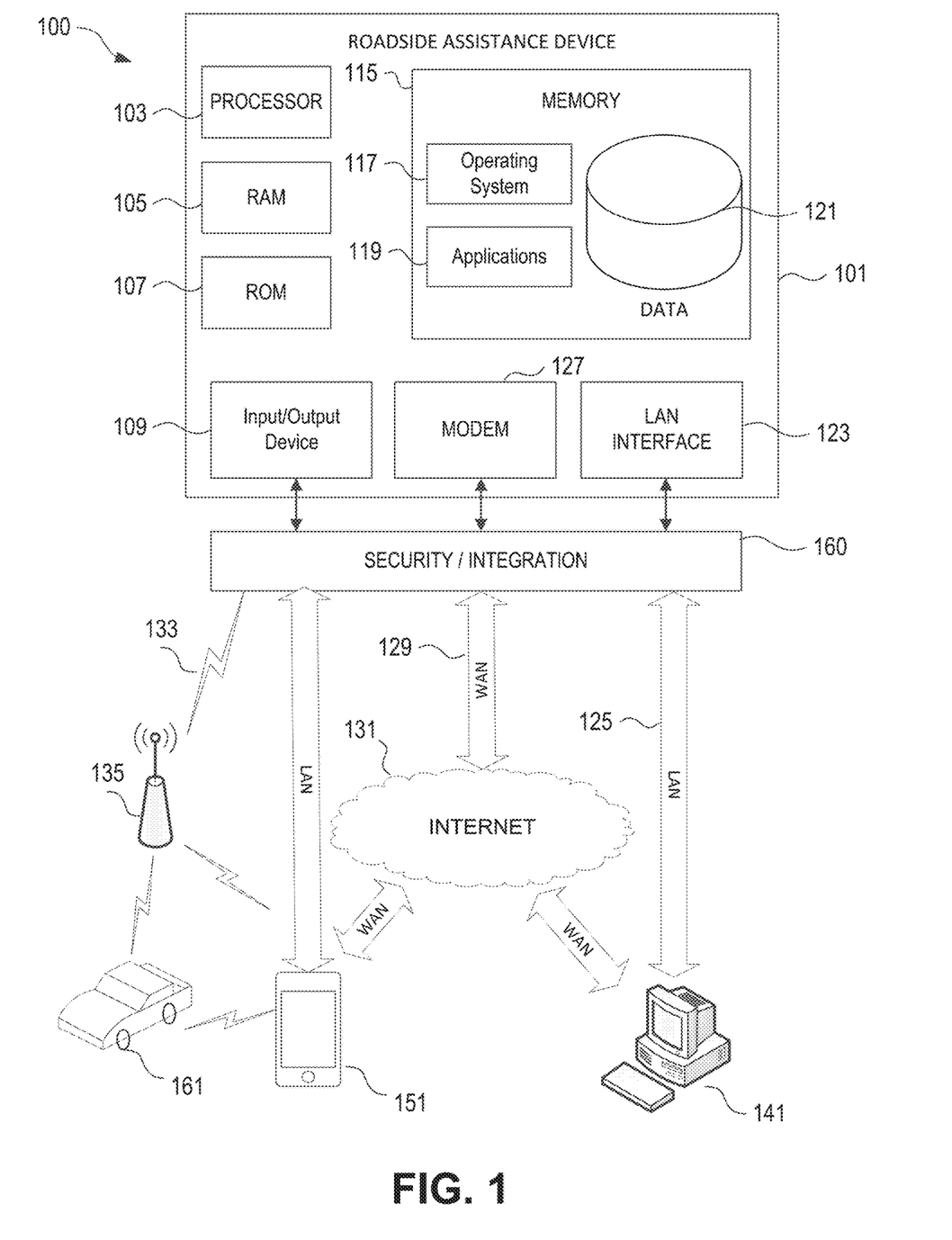
FIG. 1 is a conceptual illustration of an operating environment that may be used with various aspects according to one or more arrangements described herein.

FIG. 1 shows a block diagram of an example roadside assistance device 101 in an example operating environment 100 in accordance with an embodiment of the inventions. The roadside assistance device 101 includes a processor 103 for controlling overall operation of the roadside assistance device 101 and its associated components, including RAM 105, ROM 107, input/output (I/O) device 109, and memory 115. The roadside assistance device 101, along with one or more additional devices (e.g., terminals 141 and 151, security and integration hardware 160) can correspond to any of multiple systems or devices described herein, such as mobile devices, vehicle-based computing devices, insurance systems servers, roadside assistance service provider servers, roadside assistance servers, internal data sources, external data sources and other various devices in a roadside assistance system. These various computing systems can, individually or in combination as described herein, receive signals and/or transmissions from one or more computing devices, the signals or transmissions including data related to location of a vehicle, operating parameters of a vehicle, operating parameters of vehicle in a same or similar location to the vehicle, and the like, process the signals or transmissions to determine a location of the vehicle, a cause of an issue associated with the vehicle, and the like, using the devices of the roadside assistance systems described herein. In addition to the features described above, the techniques described herein also can be used for generating and displaying one or more different types of notifications, transmitting a request for assistance to a service center computing device, and the like.

I/O device 109 can include a microphone, keypad, touch screen, and/or stylus through which a user of the roadside assistance device 101 can provide input, and can also include one or more of a speaker for providing audio output and a video display device for providing textual, audiovisual and/or graphical output. Software can be stored within memory 115 and/or storage to provide instructions to processor 103 to direct roadside assistance device 101 to perform various actions. For example, memory 115 can store software used by the roadside assistance device 101, such as an operating system 117, application programs 119, and an associated internal database 121. The various hardware memory units in memory 115 can include volatile and non-volatile, removable and non-removable media implemented in any method or technology for storage of information such as computer-readable instructions, data structures, program modules, or other data. Certain devices and systems within roadside assistance systems can have minimum hardware requirements in order to support sufficient storage capacity, processing capacity, analysis capacity, network communication, etc. For example, one or more non-volatile hardware memory units having a minimum size (e.g., at least 1 gigabyte (GB), 2 GB, 5 GB, etc.), and/or one or more volatile hardware memory units having a minimum size (e.g., 256 megabytes (MB), 512 MB, 1 GB, etc.) can be used in a roadside assistance device 101 in order to receive and analyze the signals, transmissions, etc. including location information, vehicle operating information, and the like, determine a location of the vehicle, determine a cause of an issue associated with the vehicle, generate and transmit notifications, and the like, using the various devices of roadside assistance systems. Memory 115 also can include one or more physical persistent memory devices and/or one or more non-persistent memory devices. Memory 115 can include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 can include a single central processing unit (CPU), which can be a single-core or multi-core processor (e.g., dual-core, quad-core, etc.), or can include multiple CPUs. Processor(s) 103 can have various bit sizes (e.g., 16-bit, 32-bit, 64-bit, 96-bit, 128-bit, etc.) and various processor speeds (ranging from 100 MHz to 5 Ghz or faster). Processor(s) 103 and its associated components can allow the roadside assistance device 101 to execute a series of computer-readable instructions. For example, the roadside assistance device 101 can receive signals or transmissions including location information, vehicle operation information, scan for diagnostic codes, and the like, to determine a location of the vehicle, determine a cause of an issue associated with the vehicle, control amount and type of data received, rank service providers, provide notifications of service requests, and the like.

Computing devices (e.g., a mobile device, vehicle-based system, insurance system server, roadside assistance server, roadside assistance device, etc.) can operate in an operating environment 100 having a network supporting connections to one or more remote computers, such as terminals 141, 151, and 161. Such terminals can be personal computers or servers 141 (e.g., home computers, laptops, web servers, database servers), mobile communication devices 151 (e.g., mobile phones, tablet computers, etc.), vehicle-based computing systems 161 (e.g., on-board vehicle systems, telematics devices, mobile phones or other mobile devices within vehicles), and the like, each of which can include some or all of the elements described above with respect to the roadside assistance device 101. The network connections depicted in FIG. 1 include a local area network (LAN) 125 and a wide area network (WAN) 129, and a wireless telecommunications network 133, but can also include other networks. When used in a LAN networking environment, the roadside assistance device 101 can be connected to the LAN 125 through a network interface or adapter 123. When used in a WAN networking environment, the roadside assistance device 101 can include a modem 127 or other means for establishing communications over the WAN 129, such as network 131 (e.g., the Internet). When used in a wireless telecommunications network 133, the roadside assistance device 101 can include one or more transceivers, digital signal processors, and additional circuitry and software for communicating with wireless computing devices 151 and 161 (e.g., mobile phones, portable customer computing devices, vehicle-based computing devices and systems, etc.) via one or more network devices 135 (e.g., base station transceivers) in the wireless network 133.

Also illustrated in FIG. 1 is a security and integration layer 160 through which communications are sent and managed between the roadside assistance device 101 (e.g., a mobile device, a vehicle-based computing device, a roadside assistance server or computing platform, an intermediary server and/or external data source servers, computing device etc.) and the remote devices (141, 151, and 161) and remote networks (125, 129, and 133). The security and integration layer 160 can include one or more separate computing devices, such as web servers, authentication servers, and/or various networking components (e.g., firewalls, routers, gateways, load balancers, etc.), having some or all of the elements described above with respect to the roadside assistance device 101. As an example, a security and integration layer 160 can include a set of web application servers using secure protocols and to insulate the roadside assistance device 101 from external devices 141, 151, and 161. In some cases, the security and integration layer 160 can correspond to a set of dedicated hardware and/or software operating at the same physical location and under the control of same entities as roadside assistance device 101. For example, layer 160 can correspond to one or more dedicated web servers and network hardware in a vehicle and driver information datacenter or in a cloud infrastructure supporting cloud-based vehicle identification, location identification, vehicle operational parameters identification, issue detection, and the like. In other examples, the security and integration layer 160 can correspond to separate hardware and software components that can be operated at a separate physical location and/or by a separate entity.

As discussed below, the data transferred to and from various devices in an operating environment 100 can include secure and sensitive data, such as confidential vehicle operation data, insurance policy data, and confidential user data from drivers and passengers in vehicles. Therefore, it can be desirable to protect transmissions of such data by using secure network protocols and encryption, and also to protect the integrity of the data when stored on the various devices within a system, such as mobile devices, vehicle-based devices, insurance servers, roadside assistance devices, external data source servers, or other computing devices in the operating environment 100, by using the security and integration layer 160 to authenticate users and restrict access to unknown or unauthorized users. In various implementations, security and integration layer 160 can provide, for example, a file-based integration scheme or a service-based integration scheme for transmitting data between the various devices in an electronic display system 100. Data can be transmitted through the security and integration layer 160 using various network communication protocols. Secure data transmission protocols and/or encryption can be used in file transfers to protect the integrity of the data, for example, File Transfer Protocol (FTP), Secure File Transfer Protocol (SFTP), and/or Pretty Good Privacy (PGP) encryption. In other examples, one or more web services can be implemented within the various computing devices in the operating environment 100 and/or the security and integration layer 160. The web services can be accessed by authorized external devices and users to support input, extraction, and manipulation of the data (e.g., vehicle data, driver data, location data, roadside assistance issue data, etc.) between the various computing devices in the system 100. Web services built to support a personalized display system can be cross-domain and/or cross-platform, and can be built for enterprise use. Such web services can be developed in accordance with various web service standards, such as the Web Service Interoperability (WS-I) guidelines. Access to data and/or web services can be implemented in the security and integration layer 160 using the Secure Sockets Layer (SSL) or Transport Layer Security (TLS) protocol to provide secure connections between the computing devices. SSL or TLS can use HTTP or HTTPS to provide authentication and confidentiality. In other examples, such web services can be implemented using the WS-Security standard, which provides for secure SOAP messages using XML encryption. The security and integration layer 160 can include specialized hardware for providing secure web services. Secure network appliances in the security and integration layer 160 can include built-in features such as hardware-accelerated SSL and HTTPS, WS-Security, and firewalls. Such specialized hardware can be used in the security and integration layer 160 in front of the web servers, so that any external devices can communicate directly with the specialized hardware.

Although not shown in FIG. 1, various elements within memory 115 or other components in system 100, can include one or more caches, for example, CPU caches used by the processing unit 103, page caches used by the operating system 117, disk caches of a hard drive, and/or database caches used to cache content from database 121. For embodiments including a CPU cache, the CPU cache can be used by one or more processors in the processing unit 103 to reduce memory latency and access time. In such examples, a processor 103 can retrieve data from or write data to the CPU cache rather than reading/writing to memory 115, which can improve the speed of these operations. In some examples, a database cache can be created in which certain data from a database 121 (e.g., a database of driver data, database of vehicle information, database of location information, database of roadside assistance issue information, etc.) is cached in a separate smaller database on an application server separate from the database server (e.g., at a mobile device, vehicle-based data, or intermediary network device or cache device, etc.). For instance, in a multi-tiered application, a database cache on an application server can reduce data retrieval and data manipulation time by not needing to communicate over a network with a back-end database server. These types of caches and others can be included in various embodiments, and can provide potential advantages in certain implementations of roadside assistance systems, such as faster response times and less dependence on network conditions when transmitting and receiving driver information, vehicle information, location information, roadside assistance issue information, and the like.

It will be appreciated that the network connections shown are illustrative and other means of establishing a communications link between the computers can be used. The existence of any of various network protocols such as TCP/IP, Ethernet, FTP, HTTP and the like, and of various wireless communication technologies such as GSM, CDMA, WiFi, and WiMAX, is presumed, and the various computing devices in roadside assistance system components described herein can communicate using any of these network protocols or technologies.

Additionally, one or more application programs 119 can be used by the various computing devices within an operating environment 100 (e.g., vehicle data, driver data, location data, roadside assistance issue data, and/or roadside assistance software applications, etc.), including computer executable instructions for receiving and analyzing various signals or transmissions including location information, vehicle operating data, other vehicle operating data, and the like, determining a location of a vehicle, determining a cause of an issue, controlling an amount or type of data transmitted or received, and the like.

Roadside Assistance Systems

Figure 2:
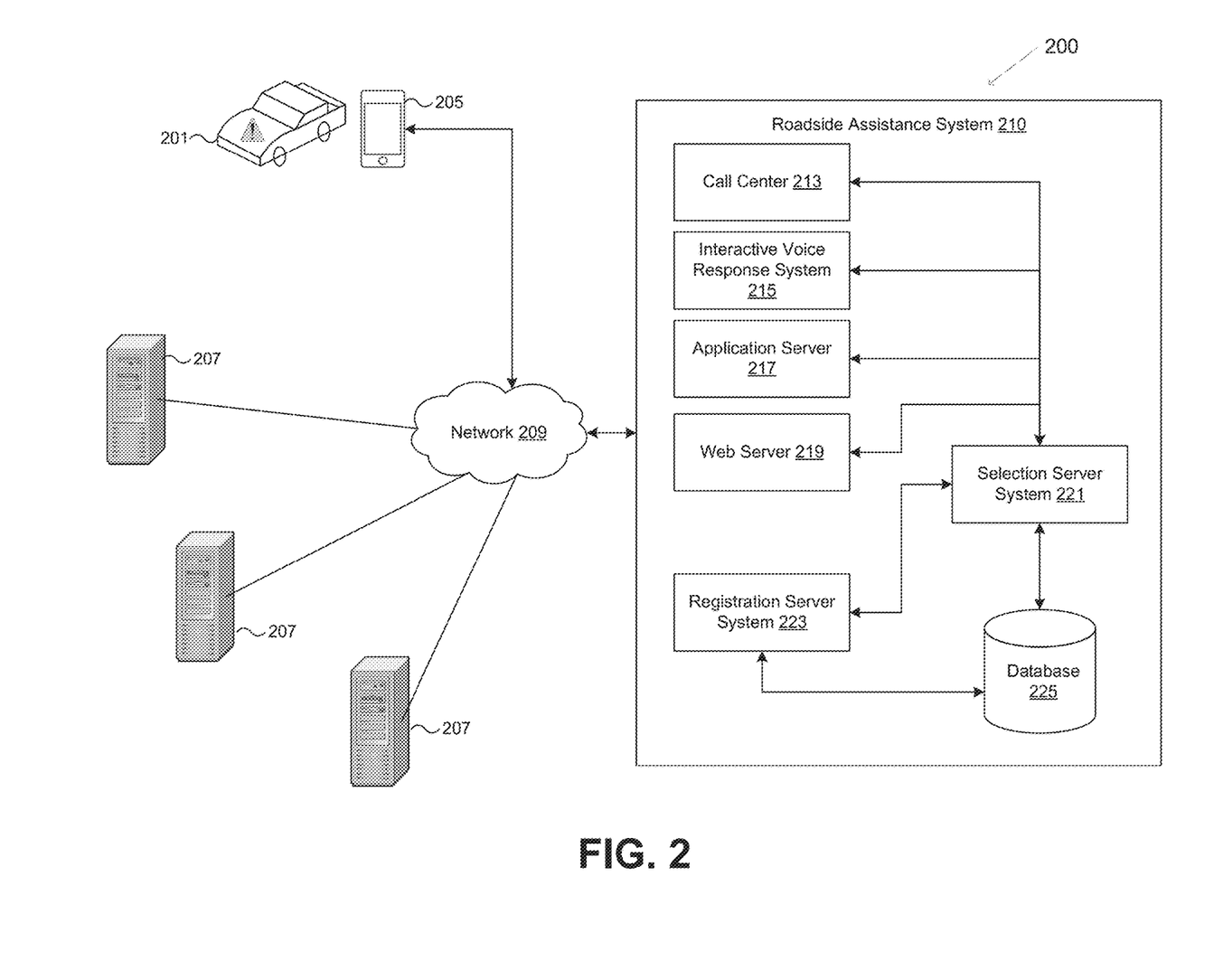
FIG. 2 is a schematic diagram showing a system for providing roadside assistance services accordingly to one or more aspects described herein.

FIG. 2 is a schematic diagram showing a roadside assistance system in accordance with embodiments of the invention. The roadside assistance system 200 can include one or more vehicles 201, one or more computing devices 205, one or more service provider systems 207, one or more networks 209, and one or more roadside assistance systems 210. The vehicle 201 is shown as a car, but the vehicle 201 can include any type of vehicle, such as a motorcycle, bicycle, scooter, drone (or other automated device), truck, bus, boat, plane, recreational vehicle, helicopter, etc. While only one vehicle 201 is shown, the system can include multiple vehicles.

The computing devices 205 and the service provider systems 207 can include, for example, a cell phone, smartphone, tablet (e.g., with cellular transceivers), laptop (e.g., communicatively coupled to cellular transceivers), wearable devices (e.g., smart watches, electronic glasses, etc.), or other types of computing devices communicating via network 209. The computing device 205 can be associated with the vehicle 201 and/or a driver or passenger of the vehicle 201. The computing device 205 and the service provider systems 207 can be configured in a similar manner as the roadside assistance device 101 and/or terminals 141, 151, and 161 of FIG. 1.

The network 209 can be a single network or a collection of multiple connected networks. The network 209 can include one or more of any of various types of information distribution networks, such as a satellite network, a telephone network, a cellular network, a Wi-Fi network, an Ethernet network, an optical fiber network, a coaxial cable network, a hybrid fiber coax network, etc. The network 209 can be a local area network (LAN), a wide area network (WAN), etc. The network 209 can be an Internet Protocol (IP) based network (e.g., the Internet). The network 209 can use a plurality of interconnected communication links to connect the computing device 205, the service provider systems 207, and the roadside assistance system 210.

The roadside assistance system 210 can include processes implemented on, for example, the roadside assistance device 101 or other types of computing devices. The roadside assistance system 210 can include one or more call centers 213, one or more interactive voice response systems 215, one or more application servers 217, one or more web servers 219, one or more selection server systems 221), one or more registration server systems 223, and/or one or more databases 225. The components of the roadside assistance system 210 can be implemented on one or more computing devices.

The roadside assistance system 210 can facilitate rendering roadside assistance services to users. The roadside assistance services can include, for example, towing, lockouts, fuel delivery, tire change, jump-starts, or other types of services. One or more service providers can provide the roadside services to users. A service provider can be, for example, an individual entity, an individual person, or an organization. A service provider can be associated with a service provider system 207.

Service providers can be registered with the roadside assistance system 210 (e.g., using the registration server system 223). The registration server system 223 can register new service providers to the roadside assistance system 210 and/or manage registered service providers. When a user requests a roadside assistance service, the roadside assistance system 210 can identify a service provider and dispatch the service provider to provide the requested roadside assistance service to the user. Information related to the service providers (and/or other service providers) can be stored in the database 225. The database 225 can include any type of storage system, such as an Oracle Database, MySQL, Microsoft SQL Server, IBM DB2, etc.

Requests for roadside assistance services can be sent to the roadside assistance system 210. For example, the vehicle 201 can encounter a vehicle malfunction and/or accident. The computing device 205 can send a request for a roadside assistance service to resolve the malfunction and/or accident situation via network 209. The roadside assistance system 210 can select a registered service provider, send a request to provide roadside assistance to the registered server service provider, and dispatch the service provider to the location of the user to handle the malfunction and/or accident situation based on acceptance of the request by the service provider system 207.

Requests for roadside assistance services can be sent to the roadside assistance system 210 in various manners. A phone call can be made to the call center 213 and/or interactive voice response system 215. The call center 213 can be, for example, an office used for receiving or sending requests by telephone. The interactive voice response system 215 can include, for example, processes implemented on computing devices that interact with humans using voice generation and/or speech recognition. The interactive voice response system 215 can recognize and process the user's request for the roadside assistance service. The call center 213 and/or interactive voice response system 215 can receive and process the request for the roadside assistance service. A roadside assistance service request can be entered into an application running on the computing device 205. The request can be sent to the application server 217. The application server 217 can include, for example, processes implemented on computing devices that communicate and/or interact with the application running on the computing device 205. The application server 217 can receive and process the user's roadside assistance service request. The roadside assistance service request can be entered into a web browser (or other types of user interfaces) running on the computing device 205. The request can be sent to the web server 219, which can receive and process the request. The roadside assistance service request can be sent via other types of user interfaces and/or other types of media, and the roadside assistance system 210 can include other types of corresponding processes for receiving and processing the user's request.

After receiving the service request, the selection server system 221 can select one or more registered service providers based on various factors, for example, in order to select an optimal service provider to render the roadside assistance service to the user. Processing a service request and selecting a service provider are described in more detail below.

Figure 3:
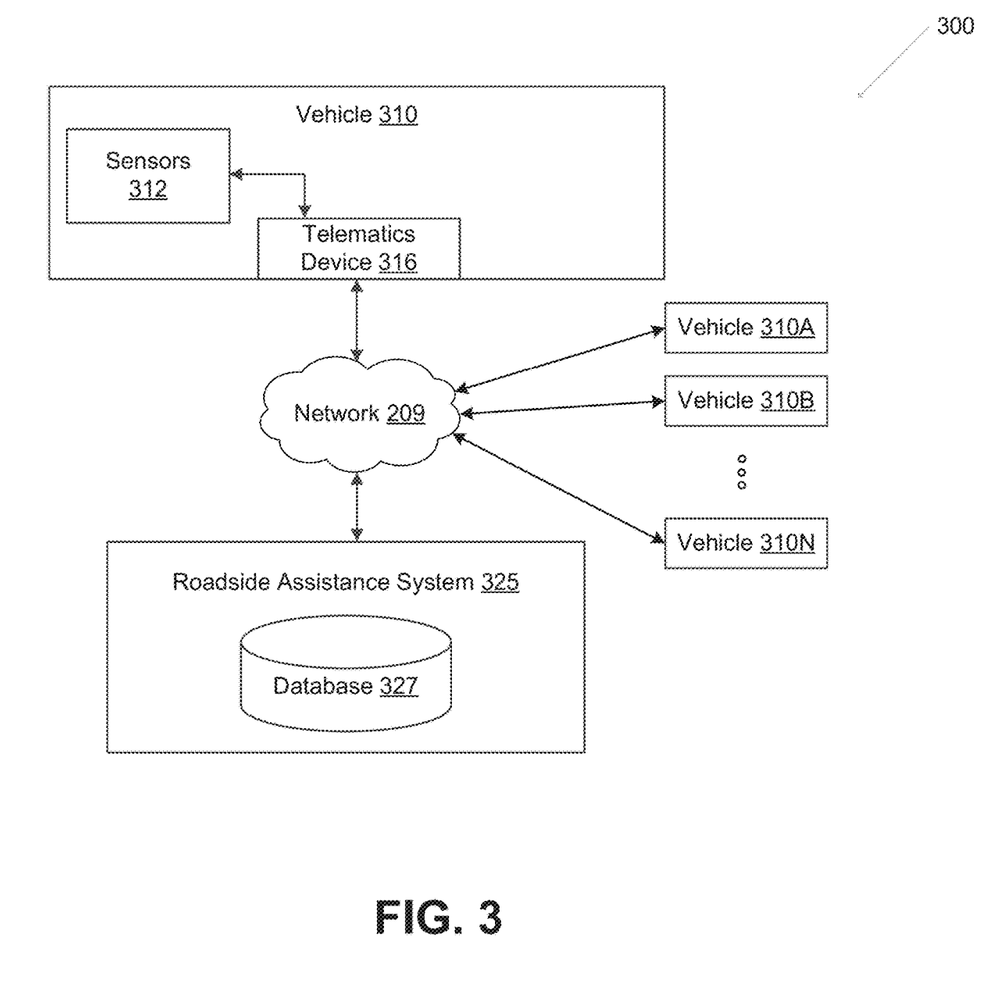
FIG. 3 is a schematic diagram showing a system for collecting data according to one or more aspects described herein.

FIG. 3 is a schematic diagram showing a system for collecting data in accordance with embodiments of the invention. Each component shown in FIG. 3 can be implemented in hardware, software, or a combination of the two. Additionally, each component of the system can include a computing device having some or all of the structural components described above for roadside assistance device 101. The system shown in FIG. 3 can include a vehicle 310, such as an automobile, motorcycle, etc. The vehicle 310 can include sensors 312 capable of detecting and recording various conditions at the vehicle and operational parameters of the vehicle. The sensors 312 may be integrated into the vehicle 310 and/or any computing device, such as a mobile device associated with an occupant of the vehicle 310, described herein. Sensors 312 can detect and store data corresponding to the vehicle's speed, distances driven, rates of acceleration or braking, and specific instances of sudden acceleration, braking, and swerving. Sensors 312 also can detect and store data received from the vehicle's 310 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems. Sensors 312 can detect and store the external driving conditions, for example, external temperature, rain, snow, light levels, and sun position for driver visibility. Sensors 312 also can detect and store data relating to moving violations and the observance of traffic signals and signs by the vehicle 310. Additional sensors 312 can detect and store data relating to the maintenance of the vehicle 310, such as the engine status, oil level, engine coolant temperature, odometer reading, the level of fuel in the fuel tank, engine revolutions per minute (RPMs), and/or tire pressure.

Sensors 312 can also record additional conditions inside or outside of the vehicle 310. Sensors 312 can include cameras that can detect conditions such as the number of the passengers in the vehicle 310 and/or potential sources of driver distraction within the vehicle (e.g., pets, phone usage, and unsecured objects in the vehicle). External cameras and/or proximity sensors can detect other nearby vehicles, traffic levels, road conditions, traffic obstructions, animals, cyclists, pedestrians, and other conditions that can factor into a driving event data analysis.

Data captured using sensors 312 can be stored using a database located within vehicle 310 and/or be transmitted to one or more external computer systems (e.g., a roadside assistance system 325). The sensors 312 can transmit data to a roadside assistance system 325 via the network 209 directly and/or via a telematics device 316.

Telematics device 316 can be a computing device containing some or all of the hardware and/or software components as the roadside assistance device 101 shown in FIG. 1. The telematics device 316 can receive vehicle operation and driving data from sensors 312 and transmit the data to roadside assistance system 325 via network 209. In a variety of embodiments, telematics device 316 includes some or all of the sensors 312. Telematics device 316 also can detect or determine additional types of data relating to real-time driving and the condition of the vehicle 310. The telematics device 316 can collect data regarding the number of passengers and the types of passengers (e.g. adults, children, teenagers, pets, etc.) in the vehicle 310. The telematics device 316 also can collect data of a driver's movements or the condition of a driver. The telematics device 316 can include or communicate with sensors that monitor a driver's movements, such as the driver's eye position and/or head position, etc. The telematics device 316 can collect data regarding the physical or mental state of the driver, such as fatigue or intoxication. The condition of the driver can be determined through the movements of the driver or through sensors, for example, sensors that detect the content of alcohol in the air or blood alcohol content of the driver, such as a breathalyzer. The telematics device 316 also can collect information regarding the driver's route choice, whether the driver follows a given route, and to classify the type of trip (e.g. commute, errand, new route, etc.). In certain embodiments, the telematics device 316 can communicate with the sensors 312 to determine when and how often the vehicle 310 stays in a single lane or strays into other lanes. To determine the vehicle's route, lane position, and other data, the telematics device 316 can include or can receive data from a mobile device, a Global Positioning System (GPS) receiver, locational sensors positioned inside a vehicle, or locational sensors or devices remote from the vehicle 310. The telematics device 316 also can store the type of the vehicle 310, for example, the make, model, trim (or submodel), year, and/or engine specifications. The vehicle type can be programmed into the telematics device 316, determined by accessing a remote computer system such as an insurance company or financial institution server, and/or can be determined from the vehicle itself, such as by querying an on-board diagnostic system installed in the vehicle 310.

Roadside assistance system 325 can be a computing device separate from the vehicle 310 and include some or all of the hardware and/or software components as the roadside assistance device 101 depicted in FIG. 1. The roadside assistance system 325 can receive and store the vehicle operation data discussed above from vehicle 310, and similar vehicle operation data from one or more other vehicles 310A-310N. The roadside assistance system 325 can include a database 327 that can store the vehicle operation data collected from the sensors and/or telematics devices of one or more vehicles. The database 327 can store sensor data, camera data (e.g., image, audio, and/or video), location data, and/or time data for one or more vehicles.

Data stored in the database 327 can be organized in any of several different manners. For example, a table in the database 327 can include all of the vehicle operation data for a specific vehicle, similar to a vehicle event log. Other tables in the vehicle operation database 327 can store certain types of data for multiple vehicles. For instance, tables can store specific driving behaviors (e.g., driving speed, acceleration and braking rates, swerving, tailgating, use of seat belts, turn signals or other vehicle controls, etc.) for multiples vehicles at specific locations, such as specific neighborhoods, roads, or intersections. Vehicle operation data can also be organized by time, so that the driving events or behaviors of multiple vehicles (and/or the drivers of the vehicles) can be stored or grouped by time (e.g., morning, afternoon, late night, rush hour, weekends, etc.) as well as location.

Generating Service Requests

Roadside assistance systems can perform a variety of processes to dispatch service providers. A roadside assistance request can be obtained and a list of potential service providers to service the roadside assistance request can be generated. Requests can then be sent to the potential service providers until a service provider accepts the request. If a service provider receives a request and does not accept the request within a specified time frame, the request can be automatically declined. The potential service providers can be ranked based on a combination of factors, including the service provider's contracted rate for the service(s) requested, the likelihood that the service provider will accept the request, historical times of arrival to other requests, performance ratings for other requests, and/or actual average cost to perform the requested services.

Figure 4:
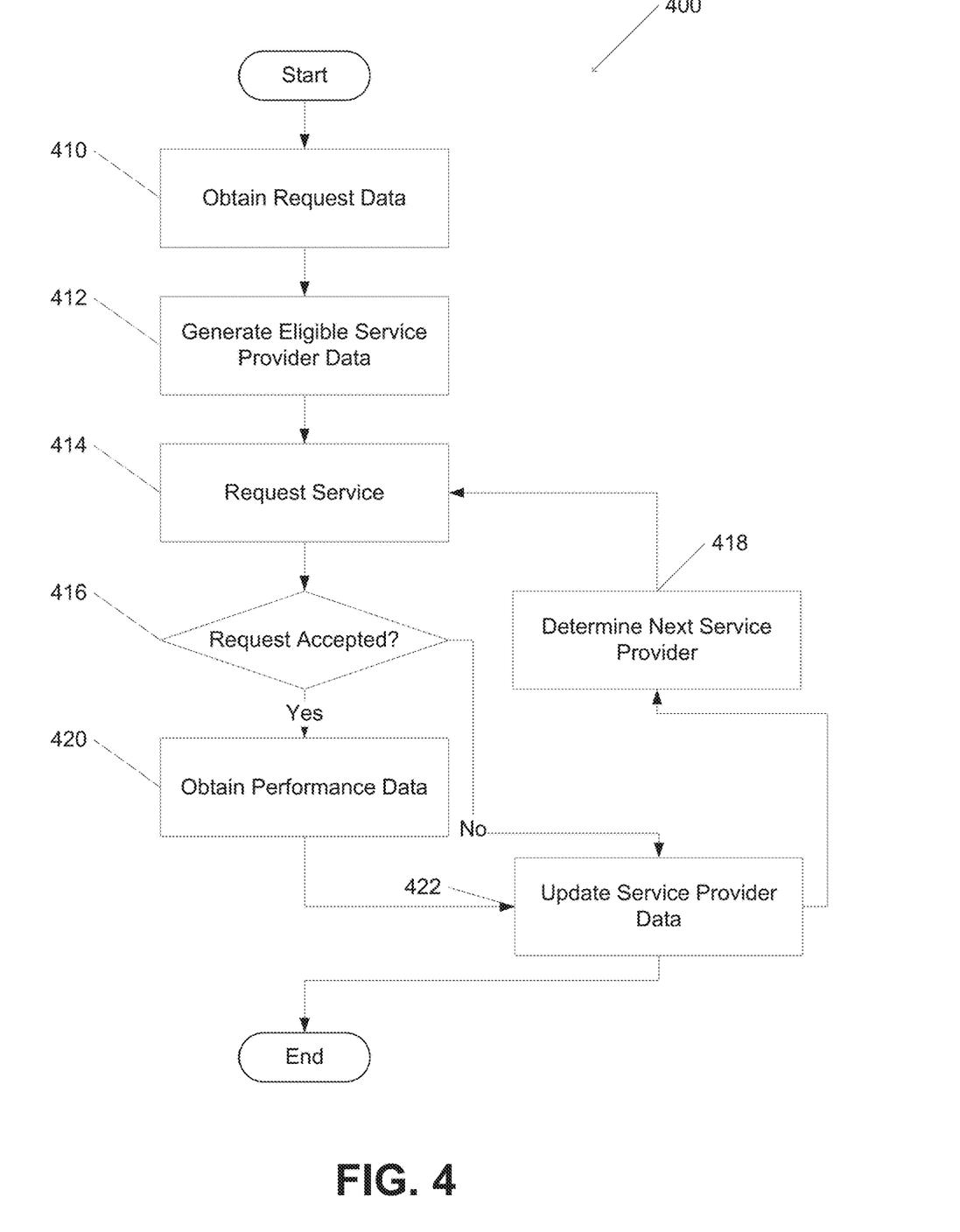
FIG. 4 is a flow chart illustrating a process for generating service requests according to one or more aspects described herein.

FIG. 4 is a flow chart illustrating a process for generating service requests in accordance with an embodiment of the invention. Some or all of the steps of process 400 can be performed by any of the computing devices described herein. Process 400 can include obtaining (410) request data. The request data can be obtained from a computing device associated with a vehicle experiencing a roadside event. The request data can include a customer name, make/model of the vehicle in need of roadside assistance, the color of the vehicle, and/or details regarding the roadside event (geographic location, service required, etc.). In a variety of embodiments, location data is generated using a location determination device, such as a Global Positioning System receiver, located in the vehicle and/or in a mobile device located inside (or proximate to) the vehicle. The request data can describe the conditions of the vehicle and/or the service required to repair the vehicle. For example, the service required can indicate that a vehicle has a flat tire (with a corresponding tire change service required) and/or that a fuel service is required (with a corresponding out of fuel condition).

Eligible service provider data can be generated (412). The eligible service provider data can be generated based on the request data. Eligible service provider data can indicate one or more service providers that can provide the requested service. An eligible service provider can provide one or more services specified in the request. The service types can include, for example, towing, lockouts, fuel delivery, tire change, jump-starts, or other types of services. A service provider can be willing to provide one or more service types based on the service provider's equipment, skill set, preference, etc. The eligible service provider data can include a listing of eligible service providers ranked based on a combination of factors, including the service provider's contracted rate for the service(s) requested, as described in more detail below. Service provider eligibility can be determined based on a variety of criteria, such as geographic area serviced, available time frames, available capacity, equipment availability, historical acceptance or rejection of service requests, average arrival time, average service time, claim performance, manufacturer and/or dealer certifications, cost of service, user feedback scores, and/or any other criteria.

Services can be requested (414). Services can be requested by sending a request message to a selected service provider. The request message can include data describing the location of the service request, the time of the request, details regarding the conditions of the vehicle, a time frame for providing the requested service, and/or a time frame for accepting the request. In many embodiments, the selected service provider is the top ranked service provider in a listing of eligible service providers. In several embodiments, the selected service provider is the service provider that provides services most closely matching those needed to service the service request.

At step 416, a determination can be made as to whether the request has been accepted. For instance, a request can be explicitly accepted and/or declined by a service provider. For example, a service provider can receive a notification on a computing device that allows the service provider to click "accept" to accept the request or "decline" to decline the service request. The request can be automatically accepted and/or declined after a particular time frame. For example, upon expiration of a predetermined time frame, the system may automatically accept or decline the request. The service provider can provide an indication specifying the default behavior (accept or reject) for automatically responding to the request. The time frame can be predetermined, defined in the request, and/or determined automatically based on the services requested. In this way, the time frame can define a period in which the request is valid. In some examples, a predetermined time frame may be thirty seconds, one minute, three minutes, five minutes, or the like.

If, at step 416, it is determined that the request is not accepted, the service provider data can be updated (422), the next service provider can be determined (418), and service can be requested (414) from, for example, the next identified service provider. The service provider data can be updated to indicate that the service provider explicitly declined the request and/or the request was automatically declined based on a threshold period expiring without an explicit response from the service provider. The service provider can also indicate specific reasons for declining the request, such as the unavailability of particular equipment, a lack of capacity to take on the service request, the service request being outside of a geographic area serviced by the service provider, the inability of the service provider to provide the request server, and/or any other reason. In this way, the listing of service providers can be automatically updated based on the real-time or near real-time performance of the service providers. The next service provider can be the next-highest ranked service provider in a list of service providers.

If, at step 416, it is determined that the request is accepted, performance data can be obtained (420). Performance data for a service request can include the response time for the service provider, the time the service request took to complete, the cost of the requested service, job performance scores, user feedback scores, and any other data as appropriate. For example, after a service request is completed, the requester of the service can provide feedback on the service provided, such as an overall rating for the service provided and/or one or more ratings specific to aspects of the service provided (e.g., the service provider's timeliness, the service provider's demeanor, etc.). A user feedback score for a service provider can correspond to, for example, an average of overall ratings for roadside services provided by the service provider. A user feedback score can be utilized in the determination of eligible service providers and/or the ranking of service providers. A job performance score can indicate the service provider's job performance after the service provider has arrived at the location of a disabled vehicle. The job performance score can be determined, for example, based on an average amount of time used for completion of a requested service. For example, if the service provider arrives at the location of a disabled service vehicle and realizes that a tool or material needed to perform the requested service is missing, the service provider can need to retrieve the tool or material, and the time used for completion of the requested service can be high.

Service provider data can be updated (422). The service provider data can be updated based on the obtained performance data. In this way, the performance of the service provider can be used to refine the generation of eligible service providers and/or the ranking of service providers as described herein. This re-ranking can be automatically performed in real-time or near real-time, thereby allowing for service providers to be targeted for service requests based on the current capacity of the service provider and/or the likelihood that the service provider will quickly accept a service request. The capacity of the service provider can also be updated based on the completion of service requests. Timing data associated with the performance of the service request can also be used to predict the future capacity of the service provider based on the particular services required for a service request.

Ranking Service Providers

A variety of service providers can provide services for a particular service request. When multiple service providers can service a request, the service providers can be ranked. The ranked list of service providers can then be utilized to select the service provider to service the particular request.

Figure 5:
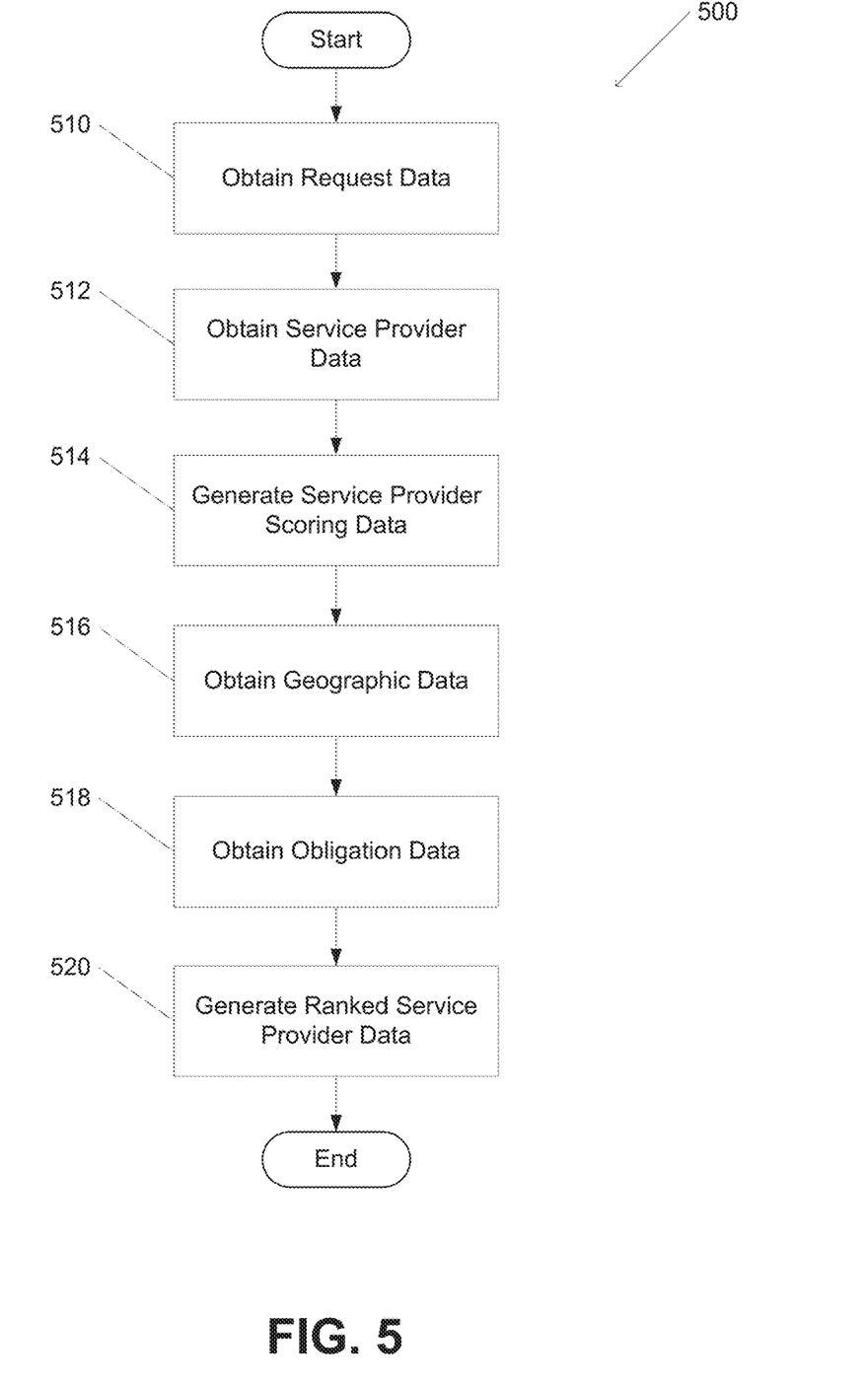
FIG. 5 is a flow chart illustrating a process for generating ranked service provider data according to one or more aspects described herein.

FIG. 5 is a flow chart illustrating a process for generating ranked service provider data in accordance with an embodiment of the invention. Some or all of the steps of process 500 can be performed by any of the computing devices described herein. Process 500 can include obtaining (510) request data. Request data can be obtained from a computing device (e.g., a mobile device associated with a driver or passenger of the vehicle, an on-board vehicle computing device, or the like) associated with a vehicle experiencing a roadside event and can include any information as described herein.

Service provider data can be obtained (512). Service provider data can be obtained from a variety of computing devices. The service provider data can include, but is not limited to, geographic area serviced, service availability time frames, available capacity, equipment available, historical acceptance or rejection of service requests, average arrival time, average service time, claim performance, manufacturer and/or dealer certifications, cost of service, and/or user feedback scores. Geographic areas serviced can be defined using various factors or criteria, such as a ZIP code, a range of latitude/longitude coordinates, particular roads (e.g. particular interstates, highways, or a region defined by a particular set of roads), county boundaries, city boundaries, a maximum distance from the service provider's location, etc. Service availability time frames can indicate the hours of operation for the service provider. The hours of operation can be pre-defined by the service provider and/or updated in real-time, such as by sending a notification indicating that the service provider is currently operating. Average arrival times and/or service times can be calculated based on historical performance by the service provider over a particular time frame, such as 30 days.

Available equipment can include any of a variety of services provided by the service provider. For example, if a service request indicates that a semi tractor needs to be towed, an eligible service provider will need to have at least one tow truck capable of towing a semi tractor. Similarly, a service request indicating that an all-wheel drive car needs towing can be serviced by a service provider having a flatbed tow truck as an all-wheel drive car typically cannot be towed with a standard tow truck. Available capacity of a service provider can be based on the total amount of equipment associated with the service provider and the number of requests currently being serviced by the service provider. For example, if a service provider has one flatbed truck and has accepted a service request for an all-wheel drive car, the service provider does not have capacity to take on a second service request for an all-wheel drive car until the first service request is completed.

Claim performance and/or cost of service can be a (weighted) average of the average submissions per service request and/or the average variance of costs paid versus the estimated cost provided by the service provider. A service provider can be associated with a manufacturer and/or dealer, thereby indicating that the service provider can provide specialized service for particular makes and/or models of vehicles and/or is a preferred service provider for a particular manufacturer or dealer. A likelihood of acceptance can be determined based on the service provider's historical acceptance rate, and can be specific to the geographical region and/or time. For example, every time a service request was assigned to the service provider, a record can be made whether the service provider accepted or rejected the service request. The service provider's historical acceptance rate can correspond to the total number of historical acceptances divided by the total number of assignments of service requests sent to the service provider.

Service provider scoring data can be generated (514). Service providers can be scored based on a dynamic weighting for one or more aspects of a service provider described in the service provider data. For example, service providers can be scored solely on the cost to provide service and the cheapest service provider will be given the best score. In another example, if service providers are scored based on cost and a manufacturer certification, a first service provider can receive a higher ranking than a second service provider providing the service at a lower cost because the first service provider is associated with a particular manufacturer. Further details for generating service provider scoring data are described in more detail below.

Geographic data can be obtained (516). The geographic data can be used to filter and/or weight service providers that can (or cannot) provide a requested service. The geographic data can include the location of the service request and/or the geographic area serviced by the service provider(s). Each of the service providers can be associated with one or more geographical regions. Associating a service provider with a particular geographical region can indicate that the service provider can provide roadside assistance services within the geographical region. For a particular geographical region, there can be a number of associated service providers providing roadside assistance services to vehicles in the geographical region. The quantity of disabled vehicles in the geographical region can change with time. The service provider's supply to one of the multiple geographical regions can be adjusted based on the service provider's preference for one or more of the geographical regions. For example, if a service provider almost always accepts service requests from a first geographical region of the multiple geographical regions and almost always rejects service requests from a second geographical regions, the service provider can receive a bonus to their score in the first geographic region and a deduction to their score in the second geographic region.

Obligation data can be obtained (518). The obligation data can be used to filter and/or weight service providers based on existing agreements and/or the historical performance of the service provider. Particular service providers can be a preferred service provider (or an excluded service provider) for particular services in particular geographic regions. The obligation data can also provide an indication of the service provider's previous performance providing services for a particular vehicle. For example, if a service provider previously provided roadside service(s) to the vehicle associated with a request and the feedback on the previously provided roadside service(s) was below a threshold rating (e.g., the service provider was rated as one out of five stars), the service provider can be filtered from servicing the request. Similarly, if the service provider received a rating over a threshold rating (such as ten on a scale of one to ten), the service provider can receive a bonus to their score for the request.

Ranked service provider data can be generated (520). Service providers can be ranked based on their respective weighted scores to determine the optimal service provider (e.g., having best job performance and/or lowest estimated time of arrival) to which to assign the received service request. The service providers can be ranked based on a combination of the service provider scores, geographic data, and/or obligation data. The scores for each service provider can be determined for each service provider of the list of eligible service providers. The ranked service provider data can include a list of eligible service providers based on their respective weighted scores (e.g., from large scores to small scores or vice versa).

Generating Scoring Data

Figure 6:
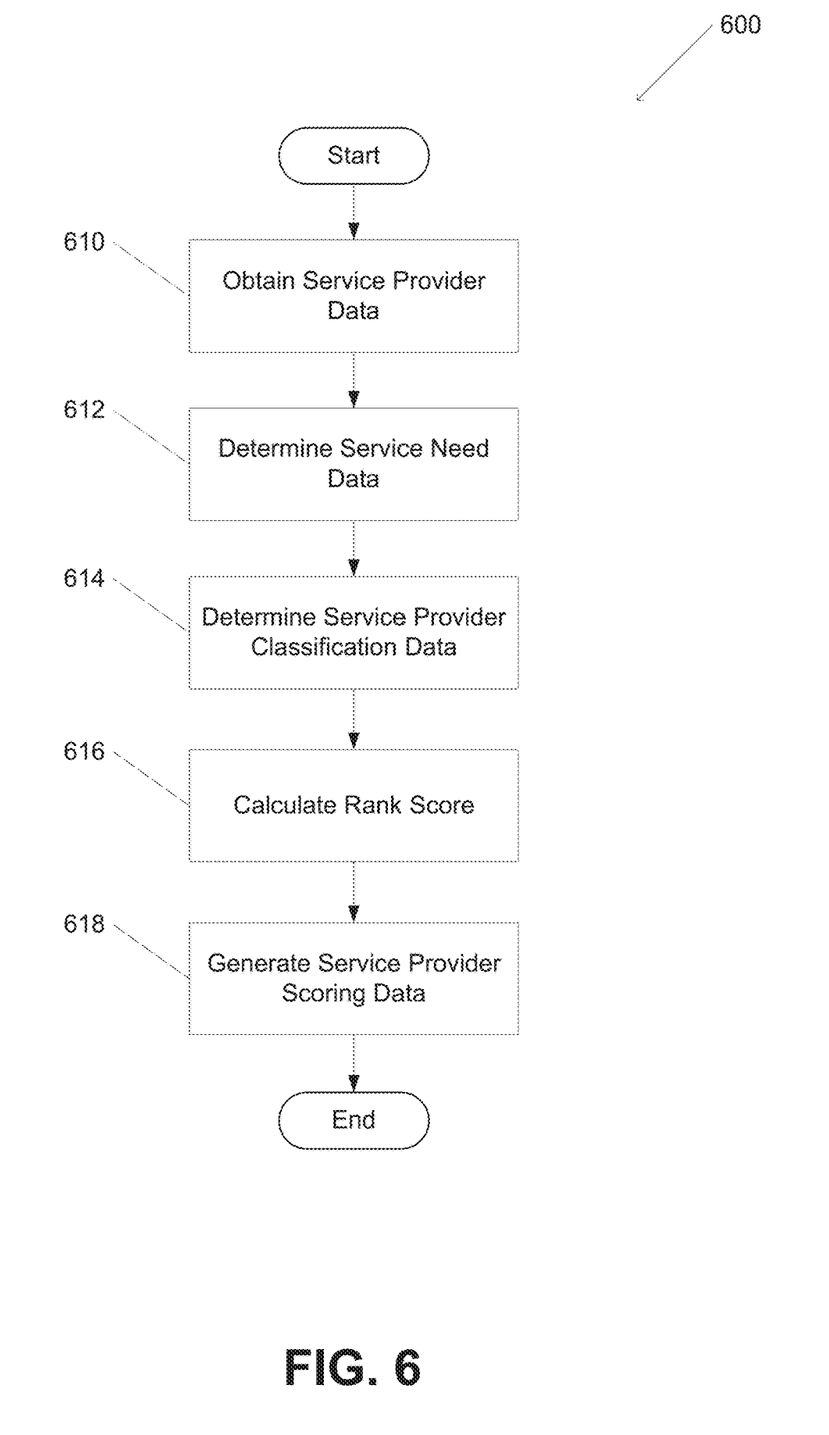
FIG. 6 is a flow chart illustrating a process for generating service provider scoring data according to one or more aspects described herein.

Service providers can be scored according to a variety of criteria. The scores can be used to rank the service providers, thereby allowing for service providers to be dynamically ranked. FIG. 6 is a flow chart illustrating a process for generating service provider scoring data in accordance with an embodiment of the invention. Some or all of the steps of process 600 can be performed by any of the computing devices described herein. Process 600 can include obtaining (610) service provider data. The service provider data can include any of the information described herein.

Service need data can be determined (612). Service needs can be determined based on a particular service request. Service needs can include, but are not limited to, service(s) requested, geographic location, the time of day the service is requested, and/or cost of service. The cost of service can be determined based on a threshold amount for the service(s) requested. The threshold amount can be adjusted based on the average price for providing the requested type of service(s) by one or more service providers. The threshold amount can correspond to other desired amounts, such as a certain percentage of the average price. The geographic location of the service request can also be used to provide location-specific adjustments to the threshold amount for the service requested.

Service provider classification data can be determined (614). Service providers can be classified according to a variety of obligations or other agreements. For example, service providers can be owned by a dealer, associated with a dealer, preferred by a manufacturer, preferred by an insurance company, in a network of service providers, and/or out of a network of service providers.

Rank scores can be calculated (616). A rank score for a service provider can include a weighted score calculated based on the service provider data, service need data, and/or service provider classification data. The particular weightings and/or aspects utilized to determine the scoring for the service providers can be determined based on the request, the vehicle being serviced, the customer associated with the vehicle being serviced, and/or any other criteria. For example, a vehicle can be associated with an insurance policy that specifies only service providers associated with the dealership which sold the vehicle can be utilized to fulfill service requests for the vehicle. Service providers can be scored based on historical performance on previous service requests. For example, a service provider score can be based on an average amount of time used for completion of a requested service (e.g., jump start). The rank score can be based on the service provider's cost estimate to fulfill the request. A variety of timing data, such as the estimated time of arrival and/or estimated time of service, for the service provider can be utilized to generate the rank score for the service provider. Service providers which are in-network (or otherwise associated with a particular dealer, manufacturer, and/or insurance service provider) can receive a bonus to their rank score. Out-of-network service providers can receive a deduction to their rank score and/or be excluded from the provider list.

Service provider scoring data can be generated (618). The service provider scoring data can include a set of service providers and the associated rank score. The service provider scoring data can be ordered according to any criteria, such as the rank score. The service provider scoring data can include a subset of service providers having a rank score above the median rank score calculated (616). The service provider scoring data can include service providers with an estimated cost to provide service below the average cost (or any other cost) to provide the requested service(s). Service providers with an estimated cost over the midpoint of the calculated range can be excluded. However, partner-specific service providers (e.g. service providers with particular classifications) can be included in the list even with an estimated cost over the midpoint. Higher priced in-network service providers can be removed from the service provider scoring data when an out-of-network service provider can provide the requested service at a lower cost.

Various aspects described herein can be embodied as a method, an apparatus, or as one or more computer-readable media storing computer-executable instructions. Accordingly, those aspects can take the form of an entirely hardware embodiment, an entirely software embodiment, or an embodiment combining software and hardware aspects. Any and/or all of the method steps described herein can be embodied in computer-executable instructions stored on a computer-readable medium, such as a non-transitory computer readable medium. Any and/or all of the method steps described herein can be embodied in computer-readable instructions stored in the memory of an apparatus that includes one or more processors, such that the apparatus is caused to perform such method steps when the one or more processors execute the computer-readable instructions. In addition, various signals representing data or events as described herein can be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures can be performed in other than the recited order, and that one or more steps illustrated can be optional in accordance with aspects of the disclosure. Further, one or more aspects described with respect to one figure or arrangement can be used in conjunction with other aspects associated with another figure or portion of the description.

What is claimed is:

1. An apparatus comprising:
   one or more processors; and
   memory storing instructions that, when executed by the one or more processors, cause the apparatus to:
      obtain request data indicating a service request at a geographic location;
      predict capacity for a plurality of service providers based on timing of completed service requests by each of the service providers, wherein the capacity for the plurality of service providers is based on an amount of equipment associated with each of the service providers;
      generate eligible service provider data based on the obtained request data, where the eligible service provider data comprises a list of the service providers predicted to have capacity, wherein the service providers on the list are ranked based on service availability of each service provider in the list of service providers and by the predicted capacity of each service provider in the list of service providers;
      provide a request to a first service provider system in the ranked list of service providers; and
      automatically update the eligible service provider data based on a response to the request.

2. The apparatus of claim 1, wherein the request data of the service request comprises a make of a vehicle, a model of the vehicle, details regarding a roadside event, and a type of requested roadside service, and wherein the ranked list of service providers is generated further based on equipment availability corresponding to the request data.

3. The apparatus of claim 1, wherein the processors execute further instructions to determine a time frame associated with the request sent to the first service provider based on a type of requested roadside service associated with the service request.

4. The apparatus of claim 1, wherein the ranked list of service providers is generated further based on historical acceptance rate specific to one or more of the geographic region or a time of the service request.

5. The apparatus of claim 1, wherein the request indicates a time frame during which the request is valid, wherein obtaining the response include automatically declining the service request on behalf of the first service provider based on expiration of the time frame.

6. The apparatus of claim 1, wherein the response to the request further includes one or more reasons for declining the request.

7. The apparatus of claim 1, wherein the ranked list of service providers is generated further based on a historical time of arrival for a service provider.

8. The apparatus of claim 1, wherein the ranked list of service providers is generated further based on a historical acceptance or rejection of past service requests.

9. A computer-implemented method, comprising:
obtaining request data indicating a service request;
predicting capacity for a plurality of service providers based on timing of completed service requests by each of the service providers, wherein the capacity for the plurality of service providers is based on an amount of equipment associated with each of the service providers;
generating eligible service provider data based on the obtained request data, where the eligible service provider data comprises a list of the service providers predicted to have capacity, wherein the service providers on the list are ranked based on service availability of each service provider in the list of service providers and by the predicted capacity of each service provider in the list of service providers;
providing a request to a first service provider system in the ranked list of service providers; and
automatically updating the eligible service provider data based on a response to the request.

10. The computer-implemented method of claim 9, wherein the request data of the service request comprises a make of a vehicle, a model of the vehicle, details regarding a roadside event, and a type of requested roadside service, and wherein the ranked list of service providers is generated further based on equipment availability corresponding to the request data.

11. The computer-implemented method of claim 9, further comprising determining a time frame associated with the request sent to the first service provider based on a type of requested roadside service associated with the service request.

12. The computer-implemented method of claim 9, wherein generating the ranked list of service providers is further based on historical acceptance rate specific to one or more of the geographic region or a time of the service request.

13. The computer-implemented method of claim 9, wherein the request indicates a time frame during which the request is valid, wherein obtaining the response include automatically declining the service request on behalf of the first service provider based on expiration of the time frame.

14. The computer-implemented method of claim 9, wherein the response to the request further includes one or more reasons for declining the request.

15. The computer-implemented method of claim 9, wherein generating the ranked list of service providers is further based on a historical time of arrival for a service provider.

16. The computer-implemented method of claim 9, wherein generating the ranked list of service providers is further based on a historical acceptance or rejection of past service requests.

17. A non-transitory computer-readable medium storing instructions for controlling a processor, the instructions causing the processor to perform steps comprising:
obtaining request data indicating a service request;
predicting capacity for a plurality of service providers based on timing of completed service requests by each of the service providers, wherein the capacity for the plurality of service providers is based on an amount of equipment associated with each of the service providers;
generating eligible service provider data based on the obtained request data, where the eligible service provider data comprises a list of the service providers predicted to have capacity, wherein the service providers on the list are ranked based on service availability of each service provider in the list of service providers and by the predicted capacity of each service provider in the list of service providers;
providing a request to a first service provider system in the ranked list of service providers; and
automatically updating the eligible service provider data based on a response to the request.

18. The non-transitory computer-readable medium of claim 17, wherein the request data of the service request comprises a make of a vehicle, a model of the vehicle, details regarding a roadside event, and a type of requested roadside service, and wherein the ranked list of service providers is generated further based on equipment availability corresponding to the request data.

19. The non-transitory computer-readable medium of claim 18, wherein generating the eligible service provider data is further based on a historical time of arrival for a service provider.

20. The non-transitory computer-readable medium of claim 17, wherein the request indicates a time frame during which the request is valid, wherein obtaining the response include automatically declining the service request on behalf of the first service provider based on expiration of the time frame.

* * * * *